United States Patent

[11] 3,614,115

[72] Inventor Malcolm F. Berglund
    4056 N. Leamington Ave., Chicago, Ill. 60641
[21] Appl. No. 859,687
[22] Filed Sept. 22, 1969
[45] Patented Oct. 19, 1971

[54] STAIR TRUCK
    1 Claim, 5 Drawing Figs.
[52] U.S. Cl. .................................................... 280/5.32,
    254/120, 254/131, 254/35
[51] Int. Cl. ...................................................... B62b 9/02
[50] Field of Search ............................................ 280/5.2,
    5.32, 47.18; 254/120, 131

[56]            References Cited
        UNITED STATES PATENTS
672,152    4/1901   Ruher ......................... 280/5.32
1,341,013  5/1920   Gadbois ....................... 280/5.32 X
2,318,231  5/1943   Katzman ....................... 280/47.18 X
2,038,047  4/1936   Johnson ....................... 254/131
1,527,582  2/1925   Falk .............................. 254/120
2,553,327  5/1951   Norman ........................ 254/120
            FOREIGN PATENTS
168,654    9/1921   Great Britain ................ 280/5.2
871,366    6/1961   Great Britain ................ 280/5.2

Primary Examiner—Leo Friaglia

ABSTRACT: Leverage means adaptable for use in combination with a conventional type of hand truck in moving heavy objects up and down stairs with a minimum of effort.

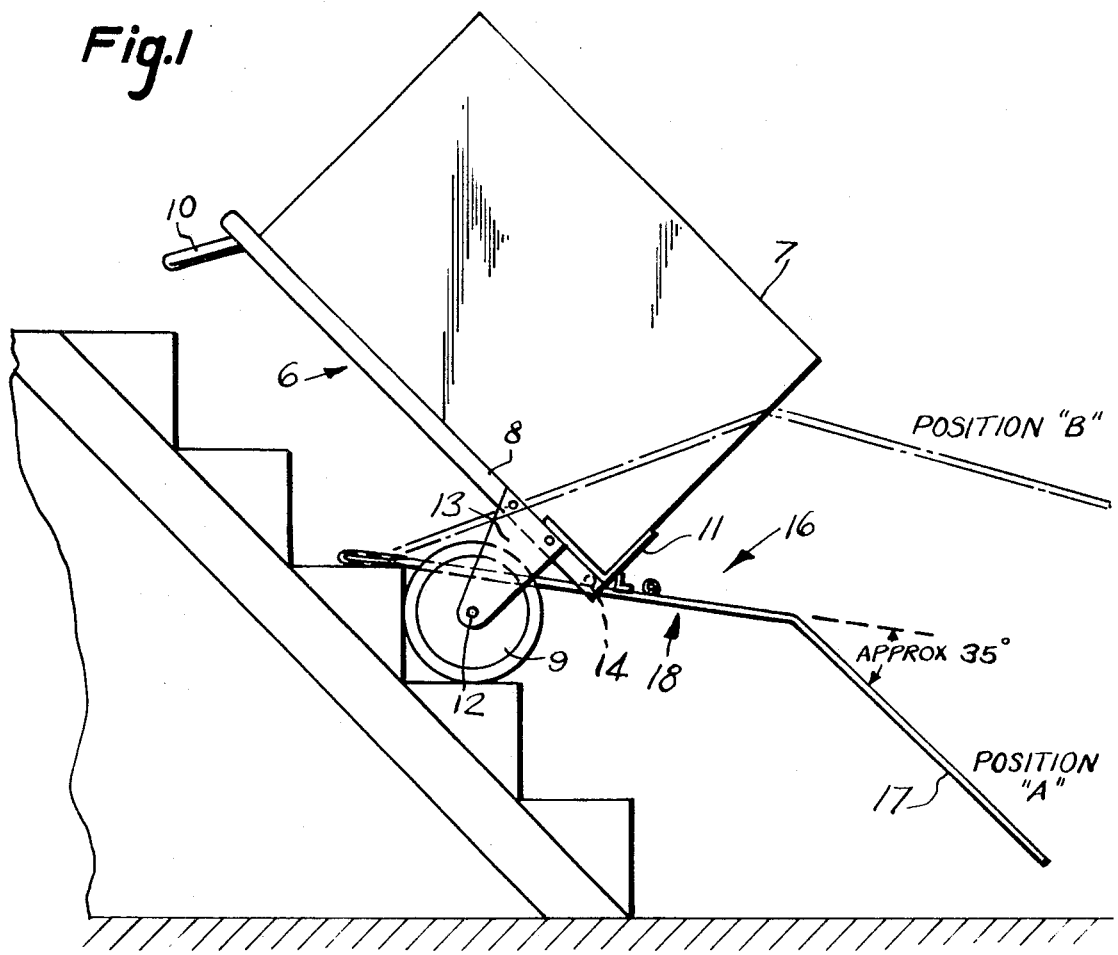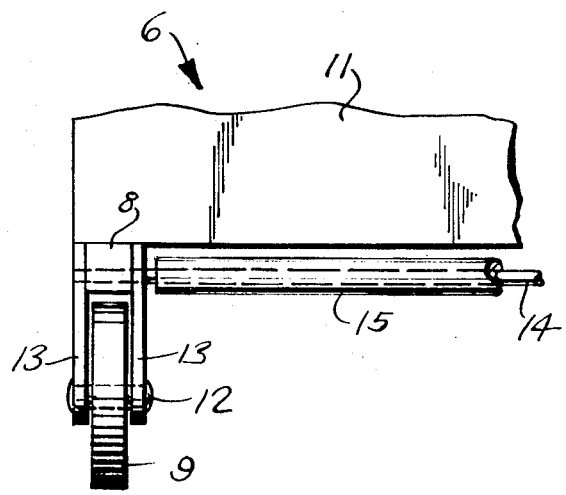

INVENTOR.
M.F. Berglund

STAIR TRUCK

The present invention, while relating to hand trucks in general, is primarily designed for moving heavy objects up and down stairs while still retaining its capacity for use in like manner as the conventional truck.

The main object of this invention is the provision, in combination with a two-wheel hand truck for the purpose set forth of leverage whereby the load on the apparatus will be greatly reduced.

Another object of the invention is the provision of a hand truck and leverage means in association therewith whereby the load sustained by the operators will be reduced from 60 to 70 percent on a common straight staircase and from 40 to 50 percent on spiral stairs.

Still another object of the invention is the provision of a truck of the character described which will function equally well going up and down stairs.

A further object of the invention is to move a hand truck carrying a heavy load up stairs, or over a rise in its path, by pushing rather than pulling the truck in a forward direction.

And still a further object of the invention is the provision of a lever which is adjustable, of unique construction and particularly adaptable to the purpose to which it is intended. To these and other ends the invention consists of certain parts and combinations of parts as fully set forth in the following description and shown in the accompanying drawings in which:

FIG. 1 is a side view of the invention showing the truck and cooperating lever in use;

FIG. 2 is an enlarged detail showing in front view the wheel and load supporting roller mountings;

Figure 3:
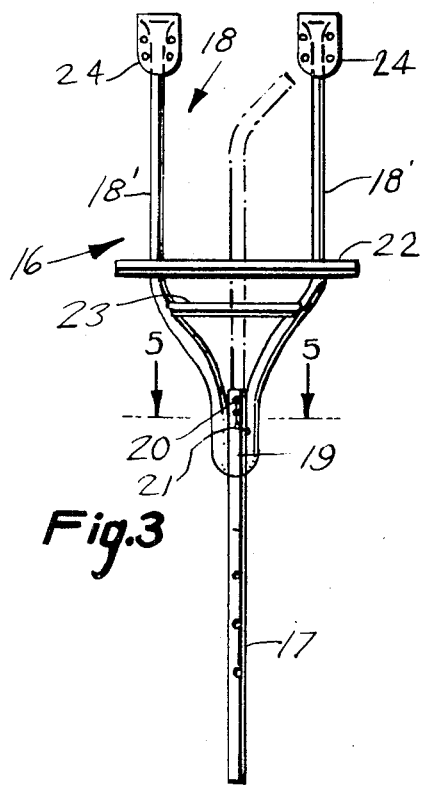
FIG. 3 is a top plan view of the adjustable lever employed with the truck and parts associated with the lever.
Figure 4:
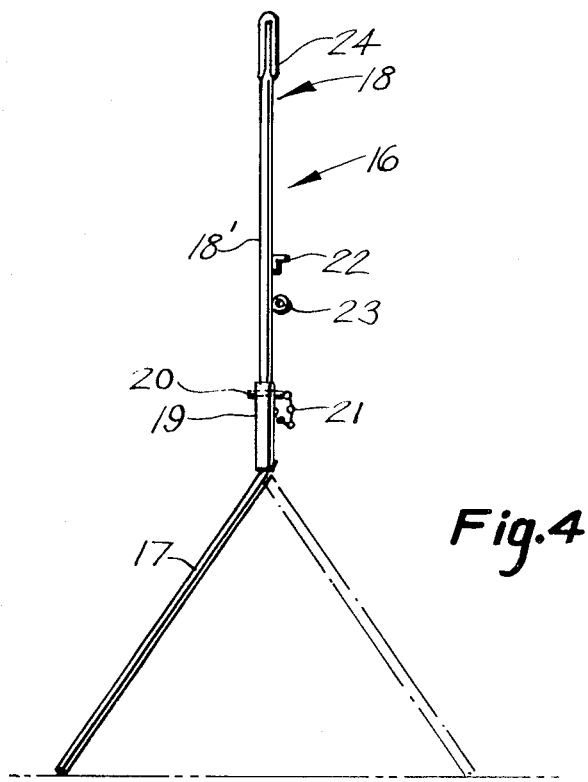
FIG. 4 is a side view of the assembled lever as seen from the left of FIG. 3.
Figure 5:
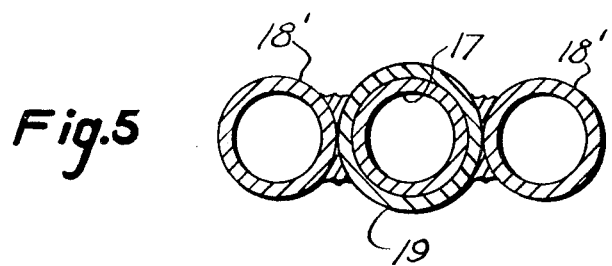
FIG. 5 is an enlarged cross section on line 5—5 of FIG. 3 looking in the direction of the arrows. In the drawings like numerals indicate similar parts throughout the different views.

A hand truck, indicated generally at 6 and carrying a balanced load 7, is shown in the position it assumes relatively to a succession of steps when being moved up or down stairs. The truck 6 includes the usual chassis forming pair of parallel side rails 8 and wheels 9 on which the rails are mounted. A handle 10 at the upper end of the rails and a connecting transverse foot plate 11 at the lower end of the rails.

The truck 6 is comparatively similar to the conventional hand truck and may be used as such. In this instance, however, the ground wheels 9 preferably have rubber tires and are of somewhat greater diameter than those in general use. Each wheel 9 lies directly under its respective side rail 8 and rotates on a spindle 12 mounted in a pair of bracket plates 13 secured to the opposite side of such rail adjacent its lower end. Connecting the extreme lower ends of the rails 8 and fixed to such rails is a transverse rod 14 on which is a tubular sleeve 15 constituting a load supporting roller.

As part of the combination but detached from the truck proper is a lever 16 (class 2 type) built, preferably of metal tubing and comprising two sections, viz. 17 and 18. Section 17 is a length of tubing approximately 35° bend adjacent its inner end. Section 18, built of tubular pipe sections includes parallel arm portions 18′—18′ equally spaced from the longitudinal center of Section 17, these arm portions terminating in converging portions, as shown in FIG. 3, which in turn end in narrowly spaced portions in parallel relation and welded to the opposing sides of an interposed sleeve number 19 forming the juncture point of lever sections 17 and 18 and in which the bent inner end of 17 is slidingly and rotatably adjustable. The forward ends of the two arms 18′—18′ are tipped with rubber fiber material 24 to prevent slippage and prevent marring the steps. Also welded to the arms 18′—18′ of lever section 2 and in spaced parallel relation are a transverse safety stop bar 22 of angle iron and handle 23.

In going up the stairs several situations are encountered. The lever 16 is adjustable to meet these situations When the correct shape is determined and adjustment made, the sections 16 and 17 are locked in place with a locking pin 20 and chain 21.

FIG. 1 demonstrates the action of the lever 16. When this lever 16 is lifted from position A to Position B, FIG. 1, the load moves up and onto the next step. The roller 15, See FIGS. 1 and 2 carries the load as it moves up.

It may be added that a certain height must be maintained so the lever engages the lifting step at only a slight angle

What I claim is:

1. In a stair truck, the combination with the side rails and ground wheels of the conventional hand truck, of a transverse rod affixed to the lower ends of said rails, a roller freely rotatable on said rod and a hand lever engaging the underside of said roller to support a load and fulcrummed on a stair tread, lifting of said lever moving said wheels from one step up and onto the next step, said lever being constructed of tubular pipe and comprising two sections, one of said sections including a pair of longitudinally extending arms converging at one end into narrowly spaced short portion engaging and welded to a coextensive interposed sleeve, a stop bar extending across and welded to said arms at the beginning of said converging portion, a handle connecting the said arm converging portion, the free outer ends of said arms being tipped with protective padding, the other of said sections comprising a length of pipe having an approximate 35° bend adjacent one end, said end portion being removably insertable in said sleeve.